Dec. 15, 1931.  B. E. BROWN  1,836,896
FLYING MACHINE OF THE HEAVIER-THAN-AIR VARIETY
Filed July 7, 1930    2 Sheets-Sheet 1
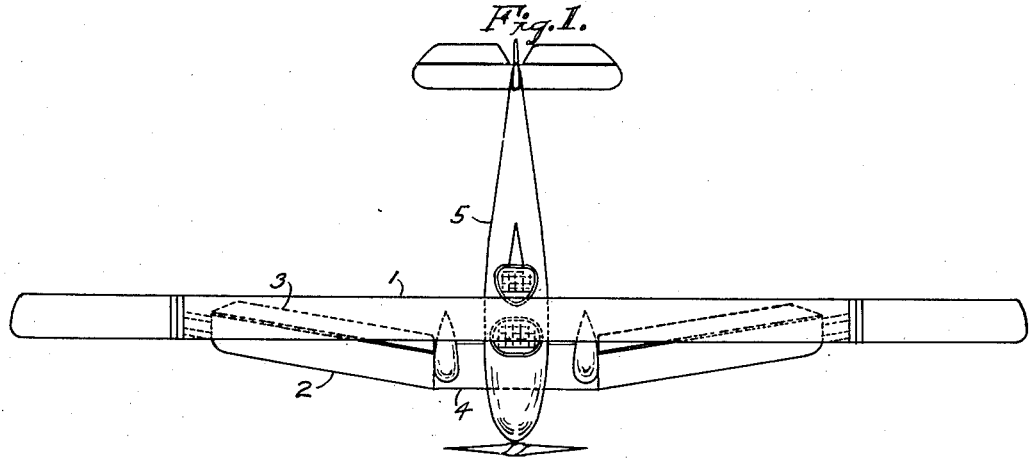
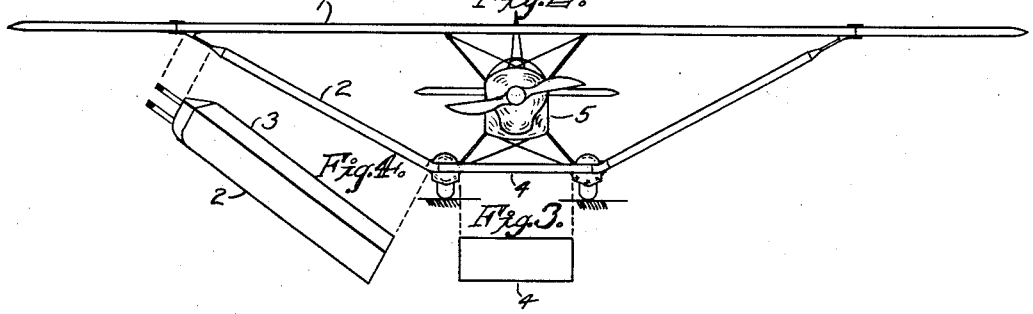
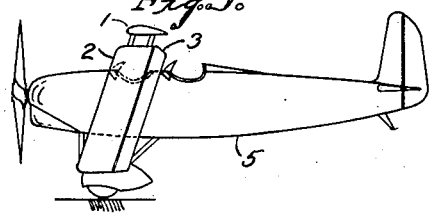
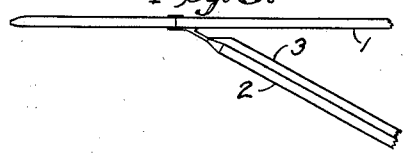
Inventor
Ben E. Brown.
by Wm. R. Burdick
Attorney Dec. 15, 1931. B. E. BROWN 1,836,896
FLYING MACHINE OF THE HEAVIER-THAN-AIR VARIETY
Filed July 7, 1930 2 Sheets-Sheet 2
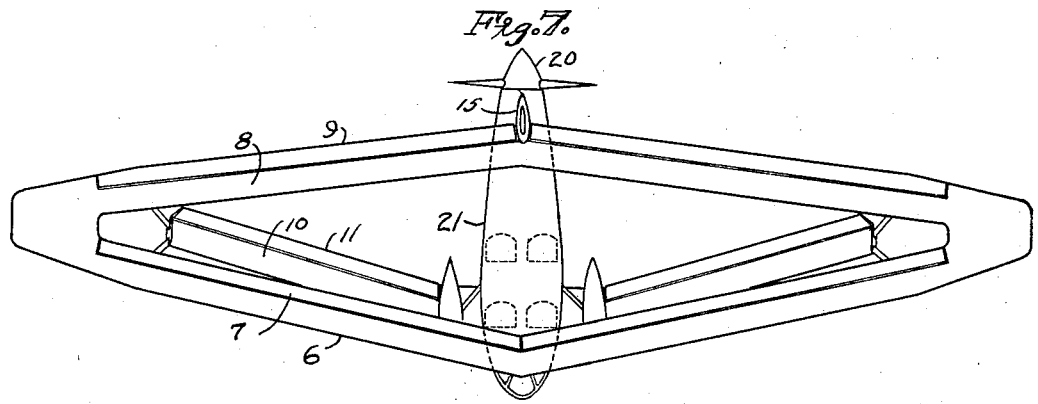
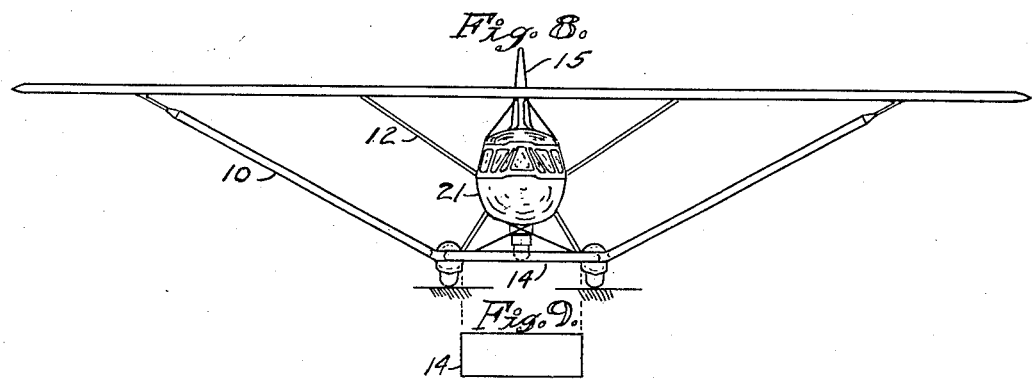
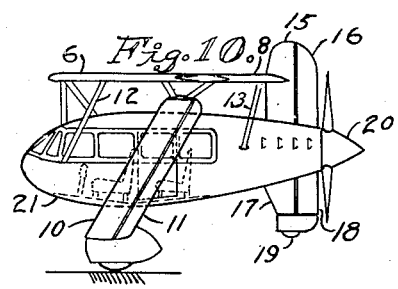
Inventor
Ben E. Brown
by Wm. L. Burdick
Attorney Patented Dec. 15, 1931

1,836,896

UNITED STATES PATENT OFFICE

BEN E. BROWN, OF LAWRENCE, KANSAS

FLYING MACHINE OF THE HEAVIER THAN AIR VARIETY

Application filed July 7, 1930. Serial No. 466,213.

This invention relates to flying machines of the heavier than air variety which are supported by the action of their wings which when forced through the air at the proper angle and speed sweep the air downward. The reaction of the air thus forced downward imports an upward force or lift to the wings which support the machine in the air. The power required to maintain the craft in level flight is the power required to overcome the drag. This drag is made up of two parts. One part is called the profile drag and is the resistance required to pull the craft through the air at the flying speed with no lift on the wings. The second part is called the induced drag and is made up of the energy used in giving the air its downward velocity. The profile drag varies approximately as the square of the speed through the air. In ordinary planes the profile drag consumes a major part of the power used in level flight at high speeds. Although the profile drag is greatly reduced at low speeds, the induced drag is increased resulting in a major part of the total drag at low speeds being contributed by the induced drag.

One of the important objects of this invention is to provide means for reducing both the profile and induced drag of aircraft of the class described, thus increasing the aerodynamic efficiency with resultant advantages hereinafter described.

It is a further object of the present invention to provide a means for making aircraft of the class described safer to operate than similar craft now in general use. Some of the most frequent causes of accidents are: (1) poor visibility from the pilot's seat; (2) small angle of climb on the take off with consequent danger of striking high objects near the field; (3) fast landing speed; (4) fire hazard; (5) poor controllability, particularly at low speeds. The present invention provides means for obtaining satisfactory visibility, increasing the climbing angle, decreasing landing speeds, decreasing fire hazard, and securing proper controllability at low flying speeds.

It is also an object of this invention to provide aircraft which is comfortable for both passengers and pilot. Increased comfort is obtained by lessening noise and vibration, by increased visibility, and by providing a type of construction which suffers less reaction from turbulent or bumpy air.

Another object of this invention is to provide means to increase the cruising range of airplanes and to improve performance at high altitudes.

I propose to build an airplane with an aspect ratio larger than that in common use by means of using short chord wings which are brought together at the end of one wing, or of both wings if of same span, for the purpose of bracing and strengthening the structure. I propose to make the distance between the wings near the fuselage several chord lengths of either wing. This allows any two wings of different span to approach each other over the major part of the span of the shorter wing before the distance between the wings becomes less than the chord of either wing. However, if the wings are of the same span and joined together at the end, then the said distance between the wings over the major part of the span would be greater than the chord length of either wing.

I further propose to fit one of the said wings with a trailing edge flap aileron conventional in design but, owing to the relative position of the two joined wings, a part of the said aileron on said wing will approach the second wing when the aileron is raised, thereby deflecting the air against the second wing and causing interplane interference. This will give rise to extra drag counterbalancing the usual extra drag on the downturn aileron on the opposite side of the fuselage.

I further propose to make it possible to do away with horizontal tail surfaces common to conventional planes by using two sets of short chord wings in tandem, either the front or rear wing or both being fitted with trailing-edge flaps which will perform the function of said horizontal tail surfaces, and enabling the plane builder, if desired, to place the propeller in the rear.

Referring to the drawings accompanying this application:—

Fig. 1 shows a top view of a conventional fuselage and tail surfaces fitted with upper and lower short chord wings, Fig. 2 is a front view of the same plane.

Fig. 3 shows a projected view of the wing section between the two landing wheels.

Fig. 4 shows a projected view of the lower wing fitted with an aileron.

Fig. 5 is a side view of the plane.

Fig. 6 shows the aileron in a raised position illustrating the special feature of the said aileron.

Fig. 7 is a top plan view of a modified form of airplane.

Fig. 8 is a front view of the airplane shown in Fig. 7.

Fig. 9 is a detailed view of the section of wing between the wheels of the airplane shown in Fig. 7, and Fig. 10 is a side elevation of the airplane shown in Fig. 7.

In referring to Figs. 1 to 6 inclusive, the gap between the upper wing 1 and the lower wing 2, near the fuselage 5, is several times the chord length of either wing. This allows the lower wing 2 to approach the upper wing 1 over a major part of its sloped portion before the distance between the wings becomes less than a chord length and before serious wing interference occurs. The lower wing 2 tapers near its end and terminates into two small struts so as to avoid excessive drag where the two wings are joined together. This type of structure demands a shorter chord wing than conventional structures of like wing area. The bracing effect obtained by joining the two wings enables the span of the top wing 1 to be much greater than that of the conventional plane. The large span and short chord of these wings result in an aspect ratio several times greater than commonly employed in such craft.

The aileron 3, as it is raised, approaches the upper wing 1 and deflects the air toward said wing. This results in confining the air and gives rise to an extra drag. This extra drag is needed to counteract the extra drag on the down turned aileron on the opposite side of the plane. Ordinarily at low speeds when an aileron is turned downward through a large angle, the increased drag causes the ship to yaw or turn toward the wing with the down turned aileron. This has the effect of slowing the wing down which decreases the lift on said wing. At the same time, the wing with the upturned aileron is speeded up due to the turning of the plane. This causes the lift of this wing to be increased and the result is that the plane tends to bank in the opposite direction intended by the movement of the ailerons. This of course results in a dangerous situation due to loss of controllability. The resistance of the aileron illustrated in Fig. 6 counteracts the resistance of the down turned aileron on the opposite side of the craft and controllability is thereby retained even with large angular movements of the ailerons.

A projected view of the wing section 4, between the two landing wheels is shown in Fig. 3.

Referring to Figs. 7, 8 and 10 the plane is shown in a modified form. The two upper wings 6 and 8 and the lower wing 10 are each separated several chord lengths from any other wing over a major part of their entire length thus avoiding interplane interference. The two upper wings are in tandem arrangement and are joined together at the ends for the purpose of bracing and strengthening the structure as a whole and to relieve the fuselage 21 of excessive strains. This arrangement of wings gives a greater effective span for a given wing area than planes now in common use, but not as great as the arrangement illustrated by Figs. 1, 2, and 5. It is obviously more compact and more easily housed. The two top wings are fitted with trailing edge flaps 9 and 11, which work differentially to give pitching motion to the plane or to make it cimb or dive. They may also work in unison to vary the minimum flying speed. They are both pulled down to slow up the landing speed but when once in the air may be set at the proper angle to give minimum drag. This increases the speed of the plane. They may also be set at some intermediate point for climbing or taking off. In landing it is often desired to have a large drag to enable the plane to come in at a steep angle so as to clear objects on the edge of the field and still land near the edge of the field. This excessive drag may be obtained by pulling the flaps far down. If they are pulled only part way down the drag may be increased only a small amount especially at slow or climbing speeds, but the maximum lift will be greatly increased. It is desirable, as a rule, to have a high maximum lift on the take off so that the plane will leave the ground at a fairly low speed. This condition is reached without increasing the drag by an amount excessive for climbing. These flaps perform the function of the horizontal tail surfaces in conventional designs. Although the propeller could be placed at either end of the fuselage, I have shown it in the rear because with the propeller in the rear, the fuselage can be more efficiently streamlined. A spinner, 20 in Figs. 7 and 10, is fastened to the propeller to further reduce drag. The fuselage is out of the slip stream which minimizes the drag, reduces noise, increases visibility, reduces fire hazard, and frees the fuselage of grease and dirt from engine or propeller. The vertical fins 15 and 17, Fig. 10, extends both above and below the fuselage. The two parts of the rudder, 16 and 18, are hinged to the fin. A third wheel, 19 Fig. 10, helps to support the plane while on the ground. The small struts, 12 and 13, Figs. 8 and 10, are used as additional wing braces. The wing section 14, Fig. 9, is shown in a projected view between the landing wheels.

In Fig. 10 a side view of the arrangement is shown using the upper wings in tandem. This structure makes for a short rugged fuselage of nearly perfect streamline form. Due to the shortness of the wing chords and the position of the wings, unobstructed vision is possible in nearly all directions.

I claim as follows:

1. An airplane of the class described having upper wings in tandem and one or more lower wings. The distance between any of the wings at the fuselage being large in comparison to the chord length of the wings and said wings being brought together at a distance from the fuselage, with the addition that the upper wings are fitted with trailing edge flaps to be used in controlling the plane thereby doing away with the horizontal tail surfaces commonly employed and allowing the propeller to be placed in the rear.

2. An airplane comprising a pair of wings arranged in tandem and in substantially the same plane, and a fuselage, each of said wings having an aspect ratio of not less than 15 or more than 30 and being spaced from each adjacent wing a distance at least equal to the chord length of one of the wings, each of said wings having the outer portion thereof converging toward the other wing with their ends being connected, the said wings extending from the longitudinal axis of the fuselage at an angle in excess of 45°.

3. An airplane comprising a pair of wings arranged in tandem and in substantially the same plane, and a fuselage, each of said wings having an aspect ratio of not less than 15 or more than 30 and being spaced from each adjacent wing a distance at least equal to the chord length of one of the wings, each of said wings having the outer portions thereof converging toward the other with their tips meeting and secured together.

4. An airplane comprising a pair of wings arranged in tandem and in substantially the same plane, and a fuselage, each of said wings having an aspect ratio of not less than 15 or more than 30 and being spaced from each adjacent wing a distance at least equal to the chord length of the wings, each of said wings having the outer portions thereof converging toward the other wing with their ends connected, the said wings being substantially of equal chord lengths.

5. An airplane comprising a pair of wings arranged in tandem and in substantially the same plane, and a fuselage, each of said wings having an aspect ratio of not less than 15 or more than 30 and being spaced from each adjacent wing a distance at least equal to the chord length of one of the wings, one of the wings extending from a point adjacent the extreme front end of the fuselage while another of the wings extends from a point adjacent the rear end thereof, the said wings having the outer portions thereof converging toward the other with their ends being connected.

6. An airplane comprising a pair of wings arranged in tandem and in substantially the same plane, and a fuselage, each of said wings having an aspect ratio of not less than 15 or more than 30 and being spaced from each adjacent wing a distance at lease equal to the chord length of one of the wings, each of the tandem wings extending from the longitudinal axis of the fuselage at an angle in excess of 45° while converging in the direction of the other wing, the said wings being connected together adjacent their extremities and being of substantially equal chord lengths.

7. An airplane comprising a pair of wings arranged in tandem and in substantially the same plane, and a fuselage, each of said wings having an aspect ratio of not less than 15 or more than 30 and being spaced from each adjacent wing a distance at least equal to the chord length of one of the wings, said tandem wings each extending from the longitudinal axis of the fuselage at an angle in excess of 45° while converging in the direction of the other wing, the said wings being connected adjacent their outer extremities, the chord lengths of the wings being substantially equal and one of the wings extending from a point adjacent the front of the fuselage while the other wing extends from a point adjacent the rear of the fuselage.

8. An airplane comprising a pair of wings arranged in tandem and in substantially the same plane, and a fuselage, each of said wings having an aspect ratio of not less than 15 or more than 30 and being of substantial equal chord length and extending from the fuselage at an angle in excess of 45° from the longitudinal axis thereof while converging in the direction of the other wing, the wings being connected adjacent their outer extremities, one of the wings extending from a point adjacent the front end of the fuselage while another of the wings extends from a point adjacent the rear end of the fuselage.

9. An airplane comprising a pair of wings arranged in tandem and in substantially the same plane, a fuselage adapted to be supported by the wings, said wings having high aspect ratio and being spaced from each adjacent wing a distance at least equal to the chord length of one of the wings, each of said tandem wings extending from the longitudinal axis of the fuselage at an angle in excess of 45° while converging in the direction of the other and being connected adjacent their outer extremities, and a flap on at least one of the tandem wings to effect that action of the airplane in flight normally effected by horizontal tail surfaces whereby such horizontal tail surfaces may be eliminated.

10. An airplane comprising a pair of wings arranged in tandem and in substantially the same plane, a fuselage adapted to be supported by the wings, said wings having high aspect ratio and being spaced from each adjacent wing a distance at least equal to the chord length of one of the wings, each of said tandem wings extending from the longitudinal axis of the fuselage at an angle in excess of 45°, and flaps extending along the major portion of each of the tandem wings to effect that action of the airplane in flight normally effected by horizontal tail surfaces whereby horizontal tail surfaces may be eliminated, each of said wings converging in the direction of the other.

11. An airplane comprising a pair of wings arranged in tandem, and a fuselage adapted to be supported by the wings, each of said wings having an aspect ratio of not less than 15 or more than 30 and being spaced from each adjacent wing a distance at least equal to the chord lengths of the wings, the chord lengths of said wings being substantially equal, said wings meeting at the tips and being connected together to thereby relieve excessive stresses.

12. An airplane comprising a pair of wings arranged in tandem, and a fuselage adapted to be supported by the wings, each of said wings having an aspect ratio of not less than 15 or more than 30 and being spaced longitudinally of the fuselage a distance at least equal to the chord length of one of the wings, each of said wings having the outer portions thereof converging toward the other wings with their ends connected, the said wings extending from the longitudinal axis of the fuselage at an angle in excess of 45°.

13. An airplane comprising a pair of wings arranged in tandem, a fuselage adapted to be supported by the wings, said wings having high aspect ratio and being spaced from each adjacent wing a distance at least equal to the chord length of the wings, the chord lengths of the wings being substantially equal, each of said tandem wings extending from the longitudinal axis of the fuselage at an angle in excess of 45°, a rudder adjacent the rear end of the fuselage, and a propeller to the rear of the rudder, the said tandem wings each converging in the direction of the other.

14. An airplane comprising a pair of wings arranged in tandem, a fuselage adapted to be supported by the wings, said wings having high aspect ratio and being spaced from each adjacent wing a distance at least equal to the chord length of one of the wings, each of the tandem wings extending from the longitudinal axis of the fuselage at an angle in excess of 45° while converging in the direction of the other with the ends thereof being connected together, and a lower wing extending outwardly and connected to at least one of the tandem wings.

15. An airplane comprising a pair of wings arranged in tandem, a fuselage adapted to be supported by the wings, said wings having high aspect ratio and being spaced from each adjacent wing a distance at least equal to the chord length of one of the wings, each of the tandem wings extending from the longitudinal axis of the fuselage at an angle in excess of 45° while converging at their outer portions and having their tips meeting and secured together, and a lower wing extending outwardly and connected to at least one of the tandem wings.

16. An airplane comprising a pair of wings arranged in tandem and a fuselage adapted to be supported by the wings, said wings having high aspect ratio and having substantially uniform chord lengths, the wings being spaced an average distance from each adjacent wing at least equal to the chord length of the wings, each of the tandem wings extending from the longitudinal axis of the fuselage at an angle in excess of 45°, one of the wings extending from the fuselage at a point adjacent the front end thereof while another of the wings extends from the fuselage at a point adjacent the rear end thereof, the wing extending from adjacent the front end of the fuselage and the wing extending from adjacent the rear end of the fuselage being united at their tips so that excessive stresses are relieved, and a lower wing extending outwardly from the fuselage and being connected to at least one of the tandem wings.

17. An airplane comprising a pair of wings arranged in tandem, a fuselage adapted to be supported by the wings, said wings having high aspect ratio and having substantially uniform chord lengths, the wings being spaced an average distance from each adjacent wing at least equal to the chord length of one of the wings, each of said tandem wings extending from a longitudinal axis of the fuselage at an angle in excess of 45°, one of the wings extending from the fuselage at a point adjacent the front end thereof while another of the wings extends from the fuselage at a point adjacent the rear end thereof, the wing extending from adjacent the front of the fuselage and the wing extending from the rear end of the fuselage being united at their tips so that excessive stresses are relieved, and a lower wing extending outwardly and upwardly from the fuselage and terminating short of the end of one of the tandem wings to which it is attached.

18. A tailless airplane comprising a pair of wings arranged in tandem in substantially the same plane, a fuselage adapted to be supported by the wings, said wings having high aspect ratio and being spaced from each adjacent wing a distance at least equal to the chord length of one of the wings, each of said tandem wings extending from the longitudinal axis of the fuselage at an angle in excess of 45° while converging in the direction of the other at the outer portions thereof with their tips meeting and joined together, and means on at least one of the wings to effect the action of the airplane in flight normally effected by horizontal tail surfaces.

19. An airplane comprising a fuselage, at least one upper wing adapted to support the same and having an aspect ratio of not less than 15 or more than 30, a lower wing extending outwardly from the fuselage and connected to the upper wing, said upper and lower wings being spaced throughout the major portion of the length of the lower wing a distance at least equal to the chord length of said wing, the chord lengths of said upper and lower wings being substantially equal, said lower wing presenting a substantially uniform wind resistance and being rigidly maintained relative to the upper wing, and a controlling surface extending along the lower wing substantially the full length thereof, the width of the controlling surface being less than the width of said lower wing.

20. An airplane comprising a fuselage, at least one upper wing adapted to support the same and having an aspect ratio of not less than 15 or more than 30, a lower wing extending outwardly and upwardly from the fuselage at an angle from the plane of the upper wing of less than 45° and connected to the upper wing, said upper and lower wings being spaced throughout the major portion of the length of the lower wing a distance at least equal to the chord length of said wing, the chord lengths of said upper and lower wings being substantially equal, said lower wing presenting a substantially uniform wind resistance and being rigidly maintained relative to the upper wing, and a controlling surface extending along substantially the full length of one of the wings, the width of the controlling surface being less than the width of said wing.

21. An airplane comprising a fuselage, at least one upper wing adapted to support the same and having an aspect ratio of not less than 15 or more than 30, a lower wing extending outwardly from the fuselage and connected to the upper wing, said upper and lower wings being spaced throughout the major portion of the length of the lower wing a distance at least equal to the chord length of said wing, the chord lengths of said upper and lower wings being substantially equal, said lower wing presenting a substantially uniform wind resistance and being rigidly maintained relative to the upper wing, and means on both wings for increasing the maximum lift coefficient, said means for increasing the maximum lift coefficient on the lower wing extending along substantially the full length thereof, the width of the controlling surface being less than the width of said lower wing.

22. An airplane comprising an upper wing, a lower wing, ailerons of the usual trailing edge flap gear type mounted on the lower wing in a manner that when one aileron is turned upwardly one end approaches the upper wing to effect an increase in drag of magnitude sufficient to balance the normal drag caused by the downward turning of the opposite aileron, and trailing flaps on the upper wing adapted to be moved downwardly to effect the reduction of essential landing speed.

23. An airplane comprising a fuselage, at least one upper wing adapted to support the same and having an aspect ratio of not less than 15 or more than 30, a lower wing extending from the fuselage and connected to the upper wing, said upper and lower wings being spaced throughout the major portion of the length of the lower wing a distance at least equal to the chord length of said wing with the lower wing spaced from the upper wing at the end thereof, the chord length of said upper and lower wings being substantially equal, said lower wing presenting a substantially uniform wind resistance and being rigidly maintained relative to the upper wing, and a controlling surface extending along the lower wing substantially the full length thereof, the width of the controlling surface being less than the width of said lower wing.

Signed at Lawrence, Douglas County, State of Kansas, this second day of July, A. D. 1930.

BEN E. BROWN.